United States Patent [19]

Fearon

[11] Patent Number: 5,340,406
[45] Date of Patent: Aug. 23, 1994

[54] METHOD FOR REMOVING CONTAMINANTS FROM SOIL

[76] Inventor: Lee C. Fearon, P.O. Box 514, Manchester, Wash. 98353-0514

[21] Appl. No.: 52,038

[22] Filed: Apr. 22, 1993

Related U.S. Application Data

[63] Continuation of Ser. No. 879,622, May 6, 1992, abandoned, which is a continuation-in-part of Ser. No. 625,377, Jan. 28, 1991, abandoned, which is a continuation of Ser. No. 237,053, Aug. 29, 1988, abandoned.

[51] Int. Cl.$^5$ .......................... B08B 3/00; B08B 3/04; B08B 3/08; B08B 3/10
[52] U.S. Cl. ........................... 134/10; 134/12; 134/25.1; 134/26; 134/109; 134/110; 134/111; 210/634; 405/128
[58] Field of Search .............. 134/10, 12, 25.1, 26, 134/109, 110, 111; 210/634; 423/DIG. 20; 405/128

[56] References Cited

U.S. PATENT DOCUMENTS

| | | | |
|---|---|---|---|
| 4,606,774 | 8/1986 | Morris | 134/10 |
| 4,662,948 | 5/1987 | Weitzman | 134/25.1 |
| 4,793,931 | 12/1988 | Stevens et al. | 134/10 |
| 4,801,384 | 1/1989 | Steiner | 134/25.1 |

Primary Examiner—Richard Dean
Assistant Examiner—Zeinab El-Arini
Attorney, Agent, or Firm—Seed & Berry

[57] ABSTRACT

A method and apparatus for removing contaminants from soil by a closed-loop, counter-current extraction process is disclosed. The process involves a preliminary water removal step, followed by a counter-current leaching of the contaminants from the soil by an extraction solvent in one or more extraction vessels. The extraction solvent is preferably 2-methyl-2-propanol and is continuously recycled.

9 Claims, 3 Drawing Sheets

METHOD FOR REMOVING CONTAMINANTS FROM SOIL

CROSS-REFERENCE TO RELATED APPLICATIONS

This application is a continuation of U.S. patent application Ser. No. 07/879,622, filed May 6, 1992, now abandoned; which is a continuation-in-part to U.S. patent application Ser. No. 07/625,377, filed Jan. 28, 1991, now abandoned; which is a continuation of U.S. patent application Ser. No. 07/237,053, filed Aug. 29, 1988, now abandoned.

TECHNICAL FIELD

The present invention is generally directed to a method and apparatus for removing contaminants from soil, and more specifically, to closed-loop, counter-current extraction of contaminated soil with an extraction solvent.

BACKGROUND OF THE INVENTION

Contaminated soil presents a difficult disposal problem. In the past, contaminated soil has been stored in containers and either dumped in the ocean or placed in landfills. However, such disposal inherently relies on the integrity of the containment vessel, and such vessels are prone to subsequent deterioration and leakage. To avoid these problems, attempts have been made to remove contaminants from soil prior to disposal or, if the contaminants can be removed to a sufficient level, prior to reuse of the soil. For example, various solvent extraction techniques have been used to remove soil contaminants. However, these techniques typically require large and commercially impractical quantities of extraction solvent. Accordingly, there is a need in the art for a process and apparatus which removes contaminants from soil without the use of excessive quantities of extraction solvents. The present invention fulfills these needs, and provides further related advantages.

SUMMARY OF THE INVENTION

The present invention is directed to a method for removing contaminants from soil by use of counter-current extraction. In one embodiment, the method is a continuous process for extracting contaminants from soil by the following steps: mixing the contaminated soil with a clean extraction solvent to form a slurry; extraction, in a suitable vessel, of the contaminants from the soil to yield contaminated extraction solvent and a treated slurry; removal of the treated slurry and the contaminated extraction solvent from the vessel; drying of the treated slurry to yield clean soil; separation of the contaminants from the contaminated extraction solvent to yield clean extraction solvent; and reuse of the extraction solvent with further contaminated soil.

In a preferred embodiment, the contaminated soil is dewatered prior to mixing with the clean extraction solvent. The contaminated soil is then mixed with clean extraction solvent to form a slurry. The slurry is introduced into a first end of a cylindrical vessel and continuously passed through the vessel, emerging at the opposite or second end of the vessel. Additional clean extraction solvent is introduced near the second end of the vessel, travels through the vessel (in a counter-current direction relative to the travel of the slurry), and emerges at the first end of the vessel. The treated slurry emerging from the second end of the vessel has a residual contaminant level below the desired level, while the extraction solvent emerging from the first end of the vessel contains the contaminants extracted from the soil. Slurry samples are removed from outlet ports along the length of the vessel to monitor the degree of contaminant removal as the slurry passes through the vessel. The flow rate of the slurry, the extraction solvent, or both may be varied to maintain the desired reduction in soil contamination of the treated slurry exiting the second end of the vessel. The recovered treated slurry is allowed to settle in a clarifier to partially separate the soil from the extraction solvent. The soil is removed from the bottom of the clarifier, and passed to a dryer which removes the remaining extraction solvent by passing a heated gas (such as nitrogen, argon or carbon dioxide) through the soil. The contaminated extraction solvent emerging from the first end of the vessel is collected and delivered to a combined evaporation/condensation unit where the extraction solvent and low-end contaminants are removed from the high-end contaminants and condensed. The condensed extraction solvent may then be separated from the low-end contaminants by filter adsorption of the contaminants. The clean extraction solvent is then re-used by combining with additional dried, contaminated soil.

DETAILED DESCRIPTION OF THE INVENTION

Figure 1:
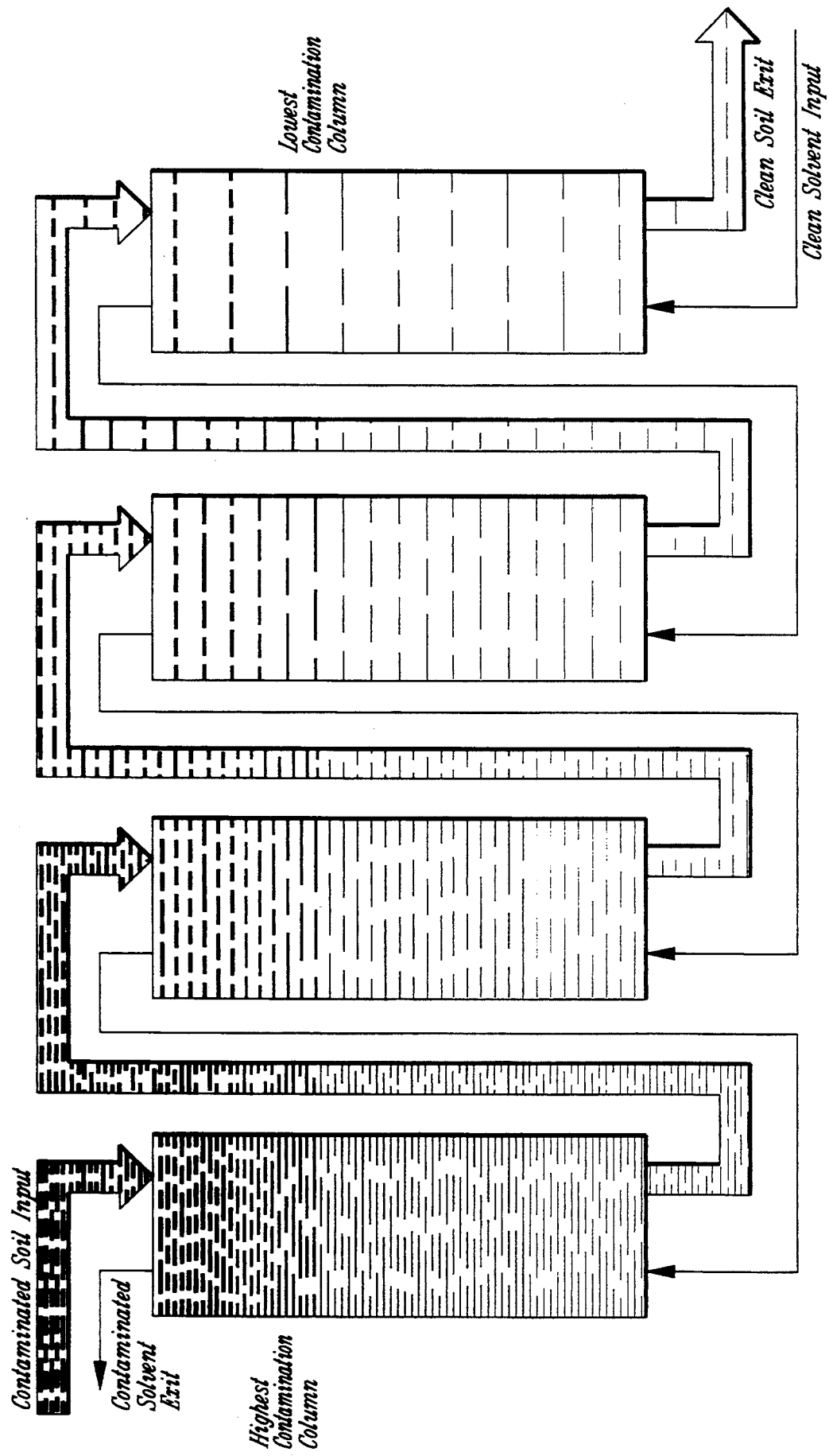
FIG. 1 illustrates a series of leaching columns according to an embodiment of the present invention.

The present invention discloses a method and apparatus for removing contaminants from soil. Contaminants are often present in soil associated with certain industrial and/or natural processes. Typically, such soil may contain from 10 ppm to 100,000 ppm contaminants. The present invention lowers the level of contaminants to a value which permits routine disposal or reuse of the soil (i.e., typically less than 10 ppm, and preferably below 2 ppm). As used in the present invention, the term "contaminants" include, but are not limited to, the following classes of compounds: polynuclear aromatic compounds (such as naphthalene, anthracene and phenanthrene), halogenated (particularly chlorinated) benzene and toluene derivatives, halogenated polynuclear aromatic compounds (such as polychlorinated biphenyls (PCBs) and polychlorinated dibenzo p-dioxins), chlorinated phenols, nitrated aromatic compounds (such as nitrobenzene and 2-nitrotoluene), nitrated polynuclear aromatic compounds, nitrated chlorophenols, phenol, oil and grease (such as gasoline, kerosene, diesel fuel and motor oil).

In the practice of the present invention, the particle size of the contaminated soil is preferably reduced to a size less than approximately two to three inches in diameter. Size reduction of the soil may be accomplished by screening the soil through a screen of appropriate size, or by selective excavation techniques. Oversized soil particles may be crushed to yield particles of acceptable size.

Contaminated soil may contain water in an amount ranging from 0% to 70% by weight. Within the present invention, it has been found that the presence of water impairs the removal of the contaminants from the soil. Thus, the extraction efficiency can be maintained by removal of water from the contaminated soil, preferably to a level below 0.5% by weight. Water removal may be accomplished by mixing the contaminated soil with a sufficient amount of calcium carbide in a water removal vessel or container. The calcium carbide is preferably added in a ratio of approximately 2 parts by weight calcium carbide to one part by weight water. The calcium carbide reacts with the water present in the soil to form acetylene gas and calcium hydroxide. The acetylene gas may be recovered (e.g., by condensation) and utilized as a fuel source, and the calcium hydroxide (i.e., lime) remains in the soil. Alternatively, magnesium carbide and aluminum carbide may also be used in this water-elimination step (the use of aluminum carbide has the advantage of generating methane, rather than acetylene, and may be recoverable as a gas rather than a condensed liquid).

When water is present in the contaminated soil in excess of approximately 70% by weight, mechanical separation may be utilized to remove bulk water prior to the water removal step discussed above.

The contaminated soil is then transferred to a vessel or leaching column which is preferably oriented in an inclined or vertical position. The contaminated soil is transferred to the top of the leaching column, and the soil passes down the leaching column with the aid of gravity. The leaching column may include a central screw or auger which may be rotated as required. If the column is vertical, very little rotation of the screw may be required for movement of the contaminated soil through the vessel. The screw effectively increases the column path length. Simultaneously, clean extraction solvent is injected into the leaching column near the base, and the extraction solvent is transported up the column by laminar flow. Injection of the clean extraction solvent into the leaching column may be accomplished through jets mounted near the base of the leaching column. The extraction solvent and soil form a slurry within the leaching column, with the extraction solvent fully wetting the soil. The extraction solvent is added in an amount sufficient to form the slurry within the leaching column, and preferable is present in an amount of approximately two to three parts extraction solvent to one part soil by volume.

Preferably, the clean extraction solvent is mixed with the contaminated soil to form a slurry prior to entry of the slurry into the reaction vessel. In addition, the extraction solvent may be heated prior to mixing with the contaminated soil to a temperature within several degrees (e.g., 2° C.) of the extraction solvent boiling point. The heated slurry is then introduced into the first end of the leaching column. The slurry may also be heated within the leaching column. Heating may be accomplished with one or more thermostatically controlled heat exchange coils mounted externally on the leaching column. The internal auger may also contain a heating source within a hollow core of the auger. Heating enhances the extraction of contaminants from the soil, especially contaminants such as PCBs, dioxins and tars. In addition, certain extraction solvents of the present invention have melting points within the temperature range which may be encountered at some clean-up locations. For example, since the melting point of 2-methyl-2-propanol is 25.6° C., it is necessary to maintain the slurry at a temperature in excess of this value. Thus, this extraction solvent and/or slurry is preferably maintained at a temperature ranging from 26° C. to 80° C. (i.e., several degrees below the boiling point of 2-methyl-2-propanol, 82.4° C.), and more preferably from 40° C. to 60° C.

While a single leaching column may be employed in the practice of the present invention, the use of multiple leaching columns (i.e., 2 or more) are particularly preferred. The size of the leaching columns that can be used in treating contaminated soil is often limited by practical considerations. The larger the diameter of the columns, the greater the chance of "channelling," which leaves portions of the sample untreated. Taller columns are limited in size by the need to provide secondary containment and, in mobile systems, by the ability to transport the columns. Very tall columns can also be more expensive to build and maintain because of structural considerations. The size of the column is one of the limiting factors in establishing a treatment rate. If a column only holds two cubic yards of material, then only two yards can be treated at any given time. If greater treatment rates are desired, this limitation may be overcome by placing the columns in parallel, so that the same support instrumentation, personnel and facilities can be used to provide the desired rate of treatment. Parallel columns are economically advantageous over using additional separate treatment units. Placing columns in series has a different effect from parallel processing (which is primarily used to increase facility output rates). Columns in series create graduated contaminant levels within the different columns, use less solvent for cleaning equivalent amounts of contaminated soil than either single columns, parallel columns, or batch processes, and allows easier system matching (thus maximizing capacity) for different soil types (e.g., soils, debris and sediments) and contaminant concentrations therein.

An example of multiple leaching columns in series is illustrated in FIG. 1, where four columns are shown in series. Contaminated soil is introduced into the top of the first column (from left to right), and remains in the column while solvent is passed from the bottom of the column to the top of the column. The contaminated solvent is collected at an exit port at the top of the first column, where it is then sent to other portions of the system for processing as disclosed below. The soil exits the first column from below, after spending an amount of time within the first column, and is transferred to the soil entrance at the top of the second column. In each column, the soil is gradationally cleaner due to flow through of the extraction solvent. Conversely, the extraction solvent is loaded with more and more contaminant as it passes from the clean solvent input near the bottom of the fourth column to the contaminated solvent exit at the top of the first column.

A single column will use more solvent than similarly sized columns in series to accomplish the same level of cleaning. Specifically, the amount of solvent used per material processed by a single column is determined by multiplying the flow rate (R) by the process time for the column (T) to obtain the product (RT). In a multiple column system, if the flow rate R and the process time T for each column is held the same, then the amount of solvent used is again the product RT, since there is only one solvent input and one solvent output for the system. However, more material is processed, proportional to the number of columns C. If similar amounts of material are considered, then the amount of solvent used by the system to process the same amount of material is approximately RT/C. Thus, employing multiple columns in series permits the use of less solvent to clean the same amount of material.

It should be noted that the amount of solvent used in a multiple column system for equivalent cleaning to a single column system is not exactly RT/C, but only approximately RT/C. This is because the solvent removed from the top of the preceding column is not clean solvent, but solvent that has some contaminant load. The contaminant load will render the solvent less effective than absolutely clean solvent. Thus, a four column system may use ⅓ less solvent than a one column system for a similar flow rate R and time T. Since cleaning the contaminated solvent is a major cost in solvent extraction systems, the placement of columns in series represents a significant economic advantage over single separation systems, such as single columns, parallel single columns, or batch processes. In addition to lower operating costs, the reduction of spent solvent generation per unit time allows smaller capital costs to be spent on solvent stripping equipment, such as distillation columns and filter devices, doubling the positive economic impact.

In addition to reducing the amount of solvent used, the use of columns in series allows system maximization to be realized more effectively than in single extraction systems. Sites with contaminated soil, debris and sediment can have a wide range of contaminant levels that can vary by as much as $10^6$ ppm. With columns placed in series, additional columns can be added to process highly contaminated sites, and columns can be removed from the treatment train at lowly contaminated sites. The rate of solvent use will, however, remain the same, which will allow the solvent stripping mechanisms to be maximized for one set of equipment. In single extraction systems, such as single columns, parallel columns, or batch units, the amount of solvent to clean each site will be a variable. Thus either the flow rate R or the time T will have to be adjusted at each site. This adjustment will result in oversized equipment at lowly contaminated sites, and undersized equipment at highly contaminated sites.

In a preferred embodiment, a series of three leaching columns are arranged such that the clean extraction solvent/contaminated soil/slurry is added to the top of a first leaching column. Upon emerging from the bottom of the first leaching column, the slurry is transported to the top of a second column by an appropriate transport mechanism, such as an auger. The slurry travels through the second and then a third leaching column in a similar manner (i.e., top to bottom). Clean extraction solvent is injected near the bottom of the third leaching column and travels up the third leaching column. Upon exiting from the top of the third leaching column, the extraction solvent (which is now partially contaminated) is injected near the bottom of the second leaching column and exits the top of the second leaching column. The extraction solvent (now laden with a higher level of contaminants) is injected near the bottom of the first leaching column and finally exits the top of the first leaching column as contaminated extraction solvent. By use of multiple leaching columns, the soil is leached or extracted multiple times before exiting the leaching columns.

The contaminants present in the soil are effectively leached into the extraction solvent during transport of the soil through the leaching column(s). In the case of a three-leaching column system, the extraction solvent introduced near the base of the third or final leaching column is essentially free of contaminants (i.e., "clean extraction solvent"), and when it is removed from the top of the first leaching column, it contains the extractable contaminants originally present in the soil (i.e., "contaminated extraction solvent"). While the clean extraction solvent may contain some residual contamination (due to the closed-loop recycling of the extraction solvent), the residual contaminant level within the clean extraction solvent must be less than the contaminant level desired in the final clean soil. Thus, if clean soil containing less than 2 ppm contaminants is desired, the clean extraction solvent cannot contain a residual contaminant level above 2 ppm, and preferably contains less than 1 ppm, and more preferably less than 0.5 ppm.

The rate of solvent addition near the bottom of each leaching column is sufficient to permit laminar flow up the leaching column, displacing the contaminated solvent ahead of it in a vertical wave. Upon reaching the top of a given leaching column, the solvent is transferred to the next column and reinjected near its bottom. In this manner, there is a counter-current flow of extraction solvent that passes through all of the leaching columns. Clean extraction solvent is introduced near the base of the third leaching column such that a gradient of contamination is maintained within the slurry. The lowest slurry contamination level is in the third leach column, while the highest slurry contamination level is in the first leach column. Exiting the bottom of the third leaching column is a treated slurry containing decontaminated soil and extraction solvent, and exiting the top of the first leaching column is the contaminated extraction solvent.

The parameters of the solvent extraction process may vary with different contaminants and contaminant concentrations within the soil. The time of extraction may be accurately controlled by monitoring the level of contaminants within slurry as it passes through the leaching columns. Within the leaching column(s), multiple depletion fronts will form which are characteristic of the individual contaminants present in the soil. It is essential to the practice of the present invention that the depletion fronts be monitored and maintained within the length of the leaching column(s). This may be accomplished by removal of slurry samples along various lengths of the column(s). These samples may then be tested for the presence of certain known contaminants within the soil. Suitable monitoring includes spectroscopy and chromatography methods (e.g., IR spectroscopy, liquid or gas chromatography, etc.). This testing equipment may be in communication with a microprocessor which controls the rate at which the slurry, extraction solvent or both are transported through the leaching column(s). For example, if one or more of the depletion fronts near the lower end of the final leaching column, the flow rate of the clean extraction solvent into the final leaching column may be increased and/or the rate at which slurry passes through the column(s) is decreased. When choosing a specific contaminant within the slurry samples for monitoring, it is important that the contaminant corresponds to a depletion front which propagates slowly as compared with the other contaminants that are present. By satisfactorily depleting the chosen substance, all contaminants can be removed from the slurry to the desired degree.

Upon exiting the top of the first leaching column, the contaminated extraction solvent is preferably pumped to a sediment tank to remove any suspended fines.

These fines are periodically removed from the sediment tank and may be directed back to the leaching column(s). The clarified contaminated extraction solvent is then passed to an evaporation/condensation unit.

The evaporation/condensation unit is used to separate the extraction solvent from the high boiling point contaminants. Preferably, the evaporation system includes one or more evaporation pots having heat exchange coils upon the outer surface of the pots. The heat exchange coils may be filled with a mixture of commercial antifreeze and water that is heated in a separate tank, and then pumped through the heat exchange coils. The pots are heated to the boiling point of the extraction solvent, and preferably in the range of 65° C. to 110° C., with the temperature being thermostatically controlled. The evaporation pots are preferably maintained under reduced pressure (e.g., 5 inches Hg below atmospheric pressure). This combination of temperature and pressure results in the boiling off of the extraction solvent and light-end contaminants (i.e., contaminants having boiling points below or near the extraction solvent boiling point), leaving behind the heavier-end contaminants (i.e., contaminants having boiling points higher than the boiling point of the extraction solvent). Diesel, used motor oil and jet fuel are almost entirely composed of these heavier-end contaminants. Gasoline and crude oil contain some light-end contaminants which leave the evaporation pots along with the extraction solvent. The heavy-end contaminants are periodically pumped from the bottom of the evaporation pots to suitable storage containers, such as DOT-approved, 55-gallon drums. These containers may then be sent to an off-site recycling facility or to an appropriate destruction facility.

The vapors released from the evaporation pots (i.e., extraction solvent and light-end contaminants) are then passed to a condensation tank. The condensing tank preferably contains cooling coils having a circulating mixture of antifreeze and water, and cooled to a temperature below the boiling point of the extraction solvent, preferably in the range of 4° C. to within several degrees of the extraction solvent boiling point. Upon contact with the cooling coils within the condensation tank, the vapors condense, collect and exit the condensation tank. The temperature of the exiting condensate is preferably monitored and maintained at a temperature below a specified value (such as 10° C. below the boiling point of the extraction solvent). If this temperature is exceeded, the evaporator heat may be shut off for a period of time sufficient to lower the temperature of the exiting condensate.

The condensate exiting the condensing tank may then pass through appropriate an filter (e.g., carbon filter) to trap any light-end contaminants which may be present in the condensate. In the practice of the present invention, the extraction solvent is chosen to be relatively transparent to the activated carbon filters. In other words, the solvent should not competitively bind to the filter material and substantially exclude or reduce the ability of the filter to remove the light-end contaminants from the extraction solvent. Upon exiting the carbon filters, the condensate consists of clean extraction solvent, free of both light- and heavy-end contaminants, and may be reused in the leaching columns (i.e., the clean extraction solvent may be re-injected at the base of the third leaching column to extract contaminant from additional contaminated soil). The activated carbon filter, containing the light-end contaminants, may be disposed or recycled in a suitable manner.

After passing through the leaching columns, the treated slurry is removed from the bottom of the last leaching column. As discussed above, the contaminant level of the slurry within the last leaching column is monitored by appropriate means (such as gas chromatography), and the flow rates of the slurry and/or extraction solvent are controlled to ensure the contaminant level in the treated slurry is below the desired value.

The treated slurry is passed to a clarifier for partial liquid/solid separation. Alternative mechanical separation devices may also be employed, such as a hydrocyclone or centrifuge. Extraction solvent is collected from the clarifier and fed to the evaporation/condensation unit described above for subsequent reuse as clean extraction solvent.

The treated soil is also collected from the clarifier. A nonflammable gas (such as $CO_2$, $N_2$ or Ar) is preferably introduced into the treated soil as a carrier gas for extraction solvent vapor, for effecting heat transfer, and to reduce potential flammability upon subsequent drying. The treated soil is then dried in a dryer, and preferably in a 30-inch diameter steel tumble dryer 12 feet long, heated by blowing 2,000 CFM of dryer gas (e.g., $CO_2$, $N_2$, Ar) into the hot air chamber. Larger dryers may be employed to increase drying capacity. The heated dryer gas then enters the tumble dryer, where it becomes saturated with extraction solvent vapors. Oxygen levels in the dryer may be monitored with an oxygen sensor. To reduce the amount of escaping dryer gas from the system, the dried soil leaving the dryer is transferred to an enclosed hopper. The dryer serves to remove the extraction solvent from the soil to the desired level to yield a clean, dry soil.

The dryer gas and extraction solvent vapors leaving the dryer may be run through a jet pulse filter system to remove dust, and then to a cold air chamber to condense the extraction solvent vapors. The dryer gas then returns to the blower, and again to the hot air chamber to complete a closed loop. The condensed extraction solvent collected from the dryer is fed to the evaporation/condensation system described above for subsequent reuse as clean extraction solvent. The dust collected in the filter system is periodically removed from the unit as clean, dry soil. The clean, dry soil is then removed from the dryer, preferably by an auger, and may be monitored with a suitable organic vapor monitor to ensure the solvent level remains below the desired level, preferably 50 ppm.

Preferably, heating of the dryer, evaporation pots and the leaching columns, is performed by heat exchangers using a commercial antifreeze/water solution. This solution is heated in a heating tank, and circulated by wet rotor pumps to the individual units for heating. The heating tank may be controlled thermostatically, and connected to suitable monitoring equipment to prevent over or under heating.

The extraction solvent of the present invention should satisfy a number of functional requirements. The solvent should have some degree of water miscibility, and should be able to adsorb a minimum of five weight percent water. If water cannot be adsorbed by the extraction solvent, there is little or no flexibility for solvent performance if any residual water remains in the soil after the water removal step. Water bubbles would form (forming two immiscible and mobile liquid phases), which would interfere with the process of extraction of the contaminants from the soil. Accordingly, in the practice of the present invention, water present in the contaminated soil is preferably removed to a level below 0.5% by weight, and the extraction should possess some degree of water miscibility to adsorb any residual water present in the contaminated soil after water removal. The solvent should also have some degree of polarity, although this criterion will depend upon the nature of the organic soil contaminants to be extracted.

The preferred boiling point of the extraction solvent is less than 85° C., although up to 105° C. is acceptable in some cases. The maximum acceptable boiling point is dictated by the nature of the organic soil contaminants to be extracted, since the solvent boiling point must be significantly lower than the boiling points (or in some cases, the decomposition temperatures) of the organic contaminants. According to the nature of the organic contaminants to be removed from the soil, different solvent groups may be used. Each group consists of several solvents having similar organic contaminant extraction characteristics. All the solvents within each individual group have boiling points within a 4° C. temperature range, and preferably within a 2° C. temperature range. The narrow boiling point of the extraction solvents within each group facilitates recovery of the extraction solvent mixture by distillation.

The latent heat of vaporization of the extraction solvent should be minimal. Most solvents that meet the miscibility and polarity criteria have latent heats of vaporization that constitutes 50% to 75% of the heat energy requirement for solvent distillation. Distillation is necessary in the present process to accomplish the separation of solvent and contaminants for subsequent recirculation of the solvent in the process loop. Accordingly, this minimal latent heat of vaporization criterion excludes methanol, ethanol and ethylene glycol as extraction solvents.

In addition, there should be a maximum density gradient (difference) between the extraction solvent and the contaminated soil. This characteristic is of importance for the efficient subsequent separation of soil from solvent after the extraction. Preferably, the solvents are less dense than the soil, and have a density ranging from 0.78–0.85 g/ml. The extraction should also not change the density of the soil. In other words, the extraction solvent, should not swell the soil, thus lowering its apparent density through buoyancy.

Halogenated solvents are not acceptable extraction solvents in the present invention due to their toxicity. Chlorinated and brominated solvents are not desirable due to both toxicity and densities, which range from being comparable with that of soil to being much greater than the density of soil. Iodinated solvents are excluded in consideration of toxicity, density, and cost. Also, halogenated solvents are not effective soil "wetting" or washing agents in comparison with non-halogenated, polar compounds such as alcohols.

For removal of low molecular weight polar and low-boiling (steam volatile) aromatic compounds (such as benzene, chlorobenzene, naphthalene) from contaminated soil, solvents having a boiling point of 66° C. ±2° C. are employed. Within this boiling point range, tetrahydrofuran (boiling point 66° C.) and methanol (boiling point 64.6° C.) are the preferred solvents.

For general removal of substituted and non-substituted aliphatic, aromatic, and alkylaromatic compounds from contaminated soil, extraction solvents having a boiling point of 83° C. ±2° C. are employed. Preferably, the extraction solvent is 2-methyl-2-propanol (boiling point 82.8° C.), although additional solvents may also be present (such as 2-propanol, boiling point 82.3° C.).

For removal of high molecular weight heavy tars and asphalt from contaminated soil, the extraction solvent should have a boiling point of 100° C. ±2° C. Preferred solvents within this boiling point range include 2,2,4-trimethylpentane (boiling point 99.3° C.), methylcyclohexane (boiling point 100.3° C.), 2,3,4-trimethyltetrahydrofuran (boiling point 101° C.), and 2,3,5-trimethyltetrahydrofuran (boiling point 100° C.). If polar contaminants are present in the soil, a polar solvent should be present, such as 2,3,4- or 2,3,5-trimethyltetrahydrofuran. Additional alcohols and ketones, such as 1-propanol (boiling point 97.2° C.), 2-butanol (boiling point 99.5° C.) and 3-pentanone (boiling point 102.7° C.), may also be utilized.

As mentioned above, the latent heat of vaporization of the extraction solvent should be minimal. The solvent recovery for the present process is accomplished on a given solvent liquid volume per unit time basis with a given amount of power (energy per unit time). For lower alcohols such as methanol and ethanol, a large percentage of the heat energy required is necessary just to convert the solvent from a liquid at its boiling point to a vapor (gaseous) form. This is known as the latent heat of vaporization. Methanol and ethanol, as a consequence, are not recovered as efficiently as higher alcohols. Table 1 below illustrates the recovery efficiencies for some alcohols. (An assumption that was made to derive these efficiencies was that the initial solvent alcohol temperature was 40° C. and that the specific heat capacity—heat energy in calories required to raise the temperature of one gram of alcohol 1° C.—is 0.7 from 40° C. up to the boiling point of the solvent; also, water with a specific heat capacity of 1.0 is included as a basis of comparison):

TABLE 1

| | | | Recovery Efficiencies | | | |
|---|---|---|---|---|---|---|
| Solvent | B.P. in °C. | Density of the solvent in g/ml at Boiling Point | Gram Molar Latent Heat of Vaporiz.* | Latent Heat of Vaporiz. per ml solvent* | Heat Required to raise 1 ml of solvent from 40° C. to Boiling Point* | Total Heat Required to vaporize 1 ml of solvent* | Heat Required Relative to 2-methyl-2-propanol |
| Water | 100 | 1.00 | 9,721 | 539.55 | 60.0 | 600.0 | 4.827 |
| Methanol | 64.65 | 0.791 | 7,098 | 221.8 | 13.65 | 235.5 | 1.895 |
| Ethanol | 78.37 | 0.785 | 9,220 | 200.4 | 21.08 | 221.5 | 1.782 |
| 1-Propanol | 97.2 | 0.804 | 7,770 | 129.5 | 32.19 | 161.7 | 1.301 |
| 2-Propanol | 82.3 | 0.786 | 7,455 | 124.3 | 23.27 | 147.6 | 1.187 |
| 2-Methyl-2-Propanol | 82.8 | 0.789 | 7,455 | 100.7 | 23.64 | 124.3 | 1.000 |
| 2-Methyl- | 108 | 0.794 | 8,001 | 108.1 | 32.24 | 140.3 | 1.129 |

TABLE 1-continued

| | | | | Recovery Efficiencies | | | |
|---|---|---|---|---|---|---|---|
| Solvent | B.P. in °C. | Density of the solvent in g/ml at Boiling Point | Gram Molar Latent Heat of Vaporiz.* | Latent Heat of Vaporiz. per ml solvent* | Heat Required to raise 1 ml of solvent from 40° C. to Boiling Point* | Total Heat Required to vaporize 1 ml of solvent* | Heat Required Relative to 2-methyl-2-propanol |
| 1-Propanol | | | | | | | |
| 2-Butanol | 99.5 | 0.806 | 7,833 | 105.9 | 33.57 | 139.4 | 1.122 |
| 1-Butanol | 117 | 0.810 | 8,190 | 110.7 | 43.66 | 154.4 | 1.242 |
| Benzyl Alcohol | 204.7 | 1.042 | 10,038 | 92.94 | 120.13 | 213.1 | 1.714 |
| Ethylene Glycol | 197.2 | 1.109 | 9,891 | 159.4 | 122.03 | 281.4 | 2.264 |

(*expressed in calories)

A particularly preferred extraction solvent of the present invention is 2-methyl-2-propanol. As illustrated in Table 1 above, this solvent exhibits superior properties, especially with respect to heat requirements, over the other solvents. While 2-methyl-2-propanol may be used as the sole extraction solvent, the solvent may optionally contain other solvents provided they have boiling points within ±2° C. of the boiling point of 2-methyl-2-propanol. For example, 2-propanol may be present. Due to the relatively high melting point of 2-methyl-2-propanol, it is advantageous to add a solvent which will lower the melting point of the solution, especially when the process is performed in a cold climate. However, the addition of optional components lowers the heat efficiency of the process, and thus these optional components should be kept to a minimum (e.g., about 20% 2-propanol is sufficient to maintain 2-methyl-2-propanol in a liquid state at operational temperatures).

Figure 2A:
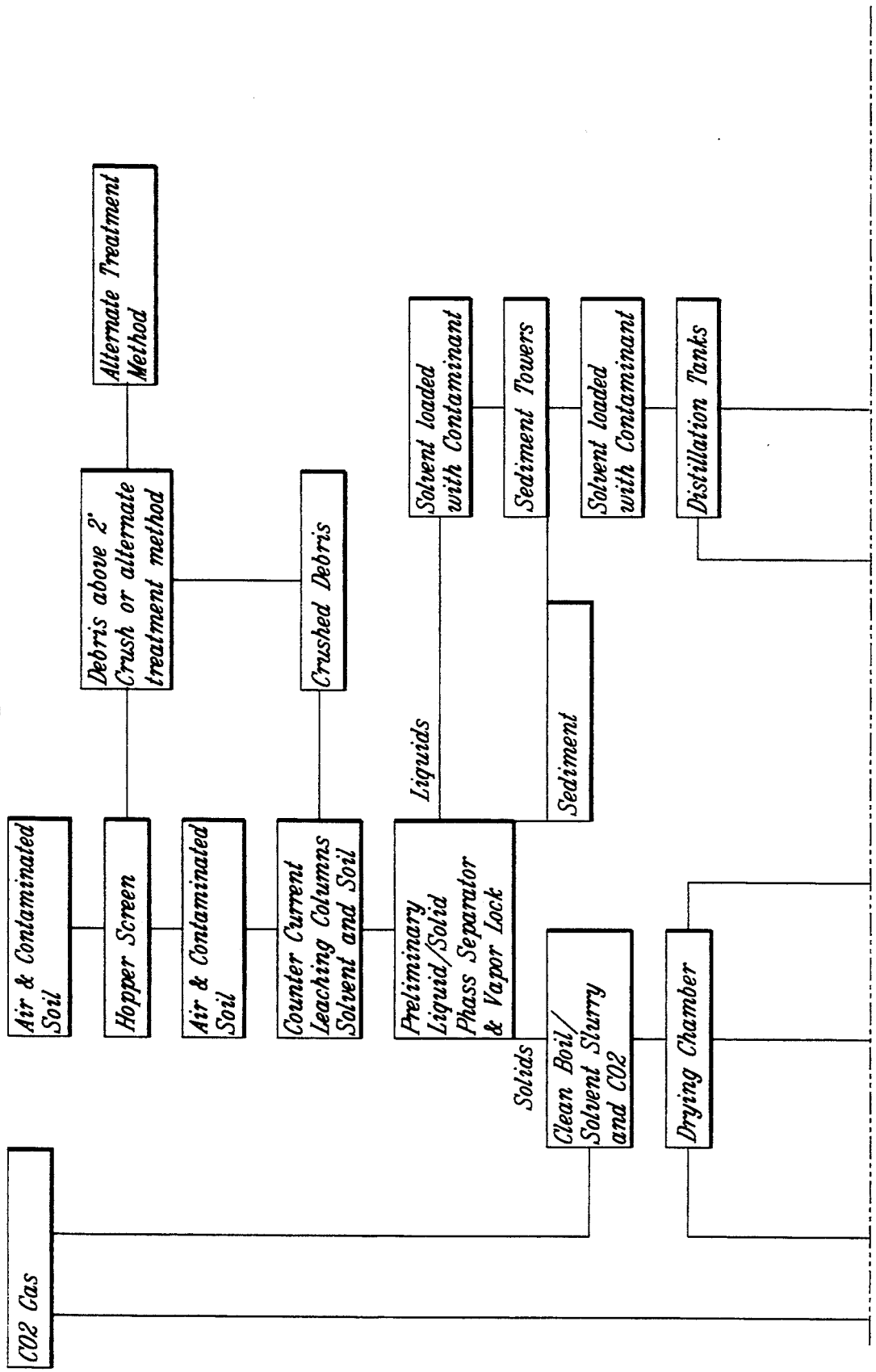
FIGS. 2a and 2b is a schematic flowchart of an embodiment of the process of the present invention.
Figure 2B:
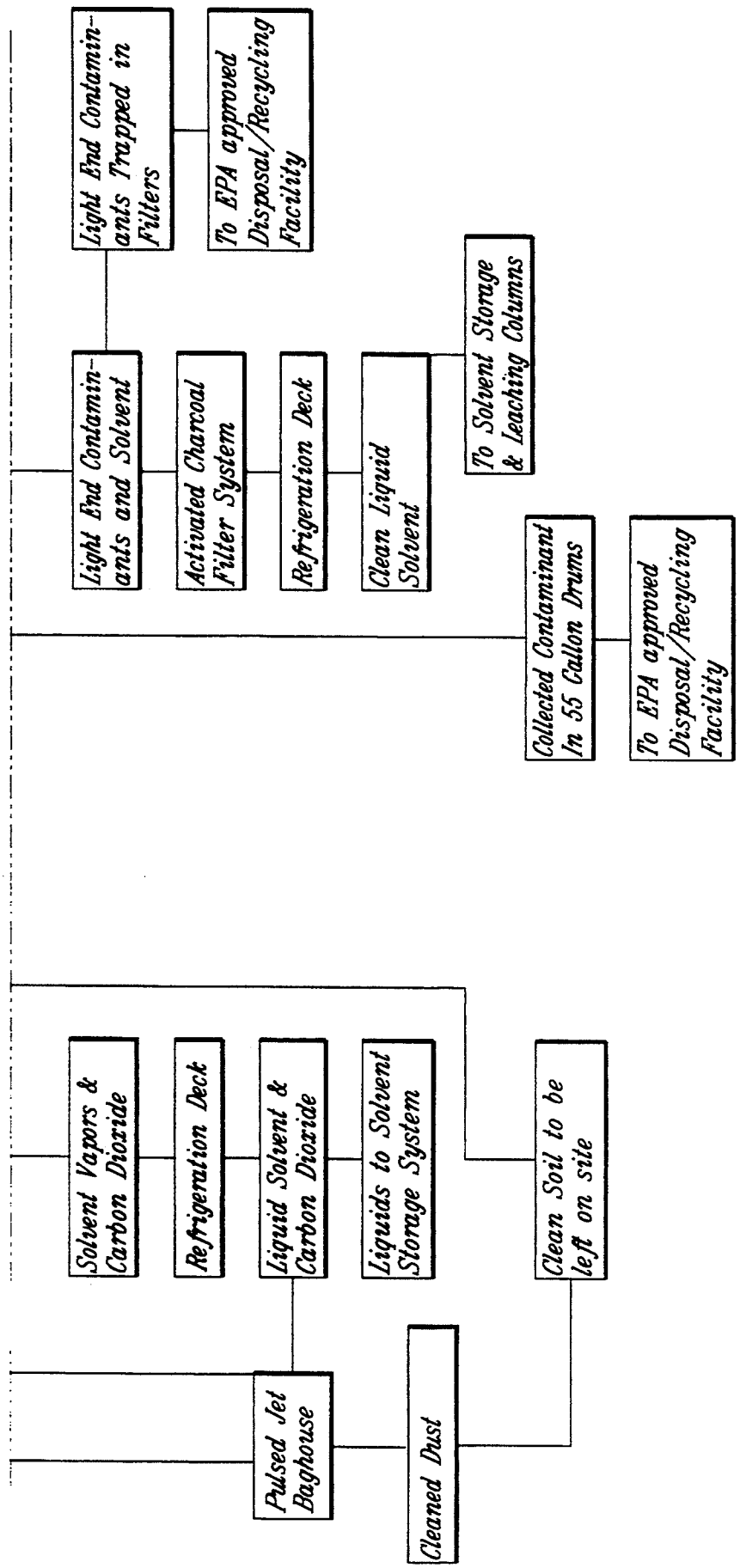

A schematic flow chart of one embodiment of the present invention is set forth in FIGS. 2a and 2b.

In a particularly preferred embodiment of the process of the present invention, contaminated soil is mixed with 2-methyl-2-propanol to form a slurry. The typical volume ratio of extraction solvent (i.e., 2-methyl-2-propanol) to contaminated soil is 3:1. Mixing is preferably performed in a vertically inclined cylindrical vessel at a temperature of 50° C.–60° C. The initial mechanical mixing is typically performed for a period of time sufficient to insure that the soil is thoroughly wetted by the solvent. The mixed slurry is then transferred into one end of a vertically inclined cylindrical leaching column. Clean extraction solvent is introduced near the opposite end of the leaching column, and the solvent/soil ratio is maintained at 2-3:1 within the leaching column. A higher temperature, close to the boiling point of the solvent, is maintained within the leaching column. Operating temperature is generally within a temperature range of 60° C.–75° C.

Treated soil is continuously removed from the leaching column and placed into a clarifier. As the soil settles downward and compacts in the clarifier, it is continuously removed from the bottom and transferred to a treated soil holding tank. The compacted soil removed from the clarifier contains solvent in an amount generally ranging from 20% to 40% by weight. The treated soil from the holding tank is sent to a soil dryer, from which dried, treated soil is continuously discharged. The temperature of the gas passing through the dryer (typically 100° C.–120° C.) is sufficient to vaporize the extraction solvent. The solvent vapors from the dryer are trapped in a gas/liquid separator and transferred to the evaporation/condensation unit and filters, and the soil fines in the gas stream are trapped in a bag house. The extraction solvent is recovered at or below the condensation temperature of the extraction solvent and routed to a clean solvent holding tank from which it is drawn for further mixing with additional contaminated soil.

Contaminated extraction solvent is continuously removed from the leaching column and is directed to the evaporation/condensation unit and filter. The extraction solvent is recovered at or below the condensation temperature of the extraction solvent and is similarly routed to the clean solvent holding tank from which it is drawn for further mixing with additional contaminated soil.

When extremely fine particles are present in the contaminated soil (which may be difficult to subsequently remove from the extraction solvent), finely powdered calcium sulfate (gypsum) may be added to the contaminated soil. This material is used at a concentration of about 1% or less of the total amount of the soil, and thoroughly mixed with the soil before processing. The calcium sulfate causes precipitation of what would otherwise be permanently colloidal suspensions of the minute particles.

As mentioned above, in a preferred embodiment of the present invention, the contaminated soil is dewatered prior to mixing with the clean extraction solvent to form the slurry. If this initial dewatering step fails to lower the water content of soil to the desired amount, and excessive water somehow presents itself in the extraction solvent, anhydrous sodium sulfate may be added to the extraction solvent prior to the evaporation/condensation steps. If sufficient water is present in the extraction solvent, uneven heating or "bumping" may occur during the evaporation/condensation steps, resulting in "blow through" of the extraction solvent. Addition of anhydrous sodium sulfate to the extraction solvent prior to evaporation/condensation effectively adsorbs the excess water and may alleviate this problem.

From the foregoing, it will be appreciated that, although specific embodiments of the invention have been described herein for purposes of illustration, various modifications may be made without deviating from the spirit and scope of the invention.

I claim:

1. A process for removing substituted and non-substituted aliphatic, aromatic, and alkylaromatic contaminants from a wet soil, comprising:
   (a) removing water from the wet soil to yield a dry contaminated soil;
   (b) mixing the dry contaminated soil with an amount of clean extraction solvent sufficient to form a slurry, wherein the extraction solvent comprises 2-methyl-2-propanol;

(c) introducing the slurry into an extraction vessel having a first end and a second end, the slurry being added to the extraction vessel at the first end and being transported through the extraction vessel in a direction toward the second end;

(d) simultaneously introducing additional clean extraction solvent into the extraction vessel, the additional clean extraction solvent being added to the extraction vessel near the second end and being transported through the extraction vessel in a direction toward the first end, the transportation of the slurry and the additional clean extraction solvent through the extraction vessel in opposite directions serving to separate the contaminants from the soil to yield a decontaminated soil and a contaminated extraction solvent, wherein a slurry sample is removed from the extraction vessel at a location between the first and second ends thereof and monitored for a contaminant, and wherein the rate at which the slurry passes from the first end to the second end, the rate at which the extraction solvent passes from the second end to the first end, or both, are controlled such that the contaminant does not exit the second end of the extraction vessel;

(e) collecting the contaminated extraction solvent at the first end of the extraction vessel;

(f) distilling or filtering the collected contaminated extraction solvent to yield clean extraction solvent and a first contaminate residue, and utilizing the clean extraction solvent as the clean extraction solvent of steps (b) or (d);

(g) collecting the decontaminated soil at the second end of the extraction vessel;

(h) drying the collected decontaminated soil to yield a dry solid and an extraction solvent vapor;

(i) collecting the extraction solvent vapor and condensing it to form an extraction solvent condensate; and (j) distilling or filtering the collected extraction solvent condensate to yield clean extraction solvent and a second contaminate residue, and utilizing the clean extraction solvent as the clean extraction solvent of steps (b) or (d).

2. The process of claim 1 wherein the slurry is heated prior to introduction to the extraction vessel.

3. The process of claim 1 wherein the slurry is heated within the extraction vessel.

4. The process of claim 1 wherein the organic extraction solvent has a boiling point ranging from about 82° C. to about 83° C.

5. The process of claim 4 wherein the organic extraction solvent comprises 2-methyl-2-propanol.

6. A process for removing contaminants from wet soil, comprising:

(a) removing water from the wet soil to yield a dry contaminated soil;

(b) mixing the dry contaminated soil with an amount of clean organic extraction solvent sufficient to form a slurry;

(c) introducing the slurry into an extraction vessel having a first end and a second end, the slurry being added to the extraction vessel at the first end and being transported through the extraction vessel in a direction toward the second end;

(d) simultaneously introducing additional clean organic extraction solvent into the extraction vessel, the additional organic extraction solvent being added to the extraction vessel near the second end and being transported through the extraction vessel in a direction toward the first end, the transportation of the slurry and the additional clean organic extraction solvent through the extraction vessel in opposite directions serving to separate the contaminants from the soil to yield a decontaminated soil and a contaminated organic extraction solvent, wherein a slurry sample is removed from the extraction vessel at a location between the first and second ends thereof and monitored for a contaminant, and wherein the rate at which the slurry passes from the first end to the second end, the rate at which the extraction solvent passes from the second end to the first end, or both, are controlled such that the contaminant does not exit the second end of the extraction vessel;

(e) collecting the contaminated organic extraction solvent from the first end of the extraction vessel;

(f) collecting the decontaminated soil from the second end of the extraction vessel;

(g) distilling or filtering the collected contaminated organic extraction solvent to yield a clean extraction solvent and a first contaminated residue, and utilizing the clean extraction solvent as the clean extraction solvent of steps (b) or (d);

(h) drying the collected decontaminated soil to yield a dry solid and an extraction solvent vapor;

(i) condensing the extraction solvent vapor to form an extraction solvent condensate; and (j) distilling or filtering the extraction solvent condensate to yield clean extraction solvent and a second contaminate residue, and utilizing the clean extraction solvent as the clean extraction solvent of steps (b) or (d).

7. The process of claim 6 wherein the organic extraction solvent has a boiling point ranging from about 64° C. to about 66° C.

8. The process of claim 6 wherein the organic extraction solvent has a boiling point ranging from about 99° C. to about 103° C.

9. A process for removing contaminants from soil, comprising:

(a) mixing the contaminated soil with an amount of clean extraction solvent sufficient to form a slurry;

(b) introducing the slurry into a first extraction vessel having a first end and a second end, the slurry being added to the first extraction vessel at the first end and being transported through the extraction vessel and exiting the second end;

(c) introducing the slurry exiting the second end of the first extraction vessel into a second extraction vessel having a first end and a second end, the slurry being added to the second extraction vessel at the first end and being transported through the second extraction vessel and exiting the second end;

(d) introducing additional clean extraction solvent into the second extraction vessel, the additional clean extraction solvent being added to the second extraction vessel near the second end and being transported through the second extraction vessel and exiting the first end, the transportation of the slurry and the additional clean extraction solvent through the second extraction vessel in opposite directions serving to separate the contaminants from the soil to yield a decontaminated soil and a partially contaminated extraction solvent;

(e) introducing the partially contaminated extraction solvent into the first extraction vessel, the partially contaminated extraction solvent being added to the first extraction vessel near the second end and being transported through the first extraction vessel and exiting the first end, the transportation of the slurry and the partially contaminated extraction solvent through the first extraction vessel in opposite directions serving to separate the contaminates from the soil to yield a partially decontaminated soil and a contaminated extraction solvent, wherein a slurry sample is removed from the first or second extraction vessels at a location between the first and second ends thereof and monitored for a contaminate, and wherein the rate at which the slurry passes from the first end of the first extraction vessel to the second end of the second extraction vessel, the rate at which the extraction solvent passes from the second end of the second extraction vessel to the first end of the first extraction vessel, or both, are controlled such that the contaminate does not exit the second end of the second extraction vessel;

(f) collecting the contaminated extraction solvent at the first end of the first extraction vessel;

(g) distilling or filtering the collected contaminated extraction solvent to yield a clean extraction solvent and a first contaminate residue, and utilizing the clean extraction solvent as the clean extraction solvent of steps (a) or (d);

(h) collecting the decontaminated soil at the second end of the second extraction vessel;

(i) drying the collected decontaminated soil to yield a dry solid and an extraction solvent vapor;

(j) collecting the extraction solvent vapor and condensing it to form an extraction solvent condensate; and (k) distilling or filtering the extraction solvent condensate to yield clean extraction solvent and a second contaminate residue, and utilizing the clean extraction solvent as the clean extraction solvent of steps (a) or (d).

* * * * *